United States Patent [19]
Taki

[11] Patent Number: 5,303,376
[45] Date of Patent: Apr. 12, 1994

[54] PROGRAM PARTIAL LINKING SYSTEM FOR LINKING A SPECIFIC PROGRAM PREPARED IN ADVANCE WHEN AN ASSIGNED PROGRAM IS NOT IN A PROGRAM LIBRARY

[75] Inventor: Hiroko Taki, Tokyo, Japan

[73] Assignee: NEC Corporation, Tokyo, Japan

[21] Appl. No.: 484,486

[22] Filed: Feb. 26, 1990

Related U.S. Application Data

[63] Continuation of Ser. No. 97,097, Sep. 16, 1987, abandoned.

[30] Foreign Application Priority Data

Sep. 22, 1986 [JP] Japan .............................. 61-224319

[51] Int. Cl.$^5$ ............................................. G06F 9/30
[52] U.S. Cl. ..................................... 395/700; 395/375; 395/725; 364/DIG. 1; 364/280; 364/280.4
[58] Field of Search ............... 364/200, 900, 364/191; 395/375, 650, 700, 800, 725

[56] References Cited

U.S. PATENT DOCUMENTS

| | | | |
|---|---|---|---|
| 4,173,782 | 11/1979 | Dixon ................................ | 364/200 |
| 4,398,249 | 8/1983 | Pardo et al. ........................ | 364/200 |
| 4,435,753 | 3/1984 | Rizzi .................................. | 364/200 |
| 4,595,981 | 6/1986 | Leung ................................ | 364/300 |
| 4,672,532 | 6/1987 | Jonge Vos .......................... | 364/200 |
| 4,719,564 | 1/1988 | Hara ................................... | 364/200 |
| 4,782,444 | 11/1988 | Munshi et al. ..................... | 364/300 |
| 4,787,034 | 11/1988 | Szoke ................................. | 364/200 |
| 4,882,674 | 11/1989 | Quint et al. ........................ | 364/200 |

OTHER PUBLICATIONS

Andrew S. Tanenbaum, *Structure Computer Organization Second Edition*, pp. 358-379.

Primary Examiner—Jerry Smith
Assistant Examiner—Mehmet Geckil
Attorney, Agent, or Firm—Foley & Lardner

[57] ABSTRACT

A program partial linking system includes an assigned program existence judgement section, an assigned program linkage section, and a specific program linkage section. The assigned program existence judgement section judges whether the program assigned by linkage information input during program linkage exists in a program library. The assigned program linkage section links the assigned program when the judgement section judges that the assigned program exists in the program library. The specific program linkage section links a specific program prepared in advance when the judgement section judges that the assigned program does not exist in the program library.

2 Claims, 2 Drawing Sheets

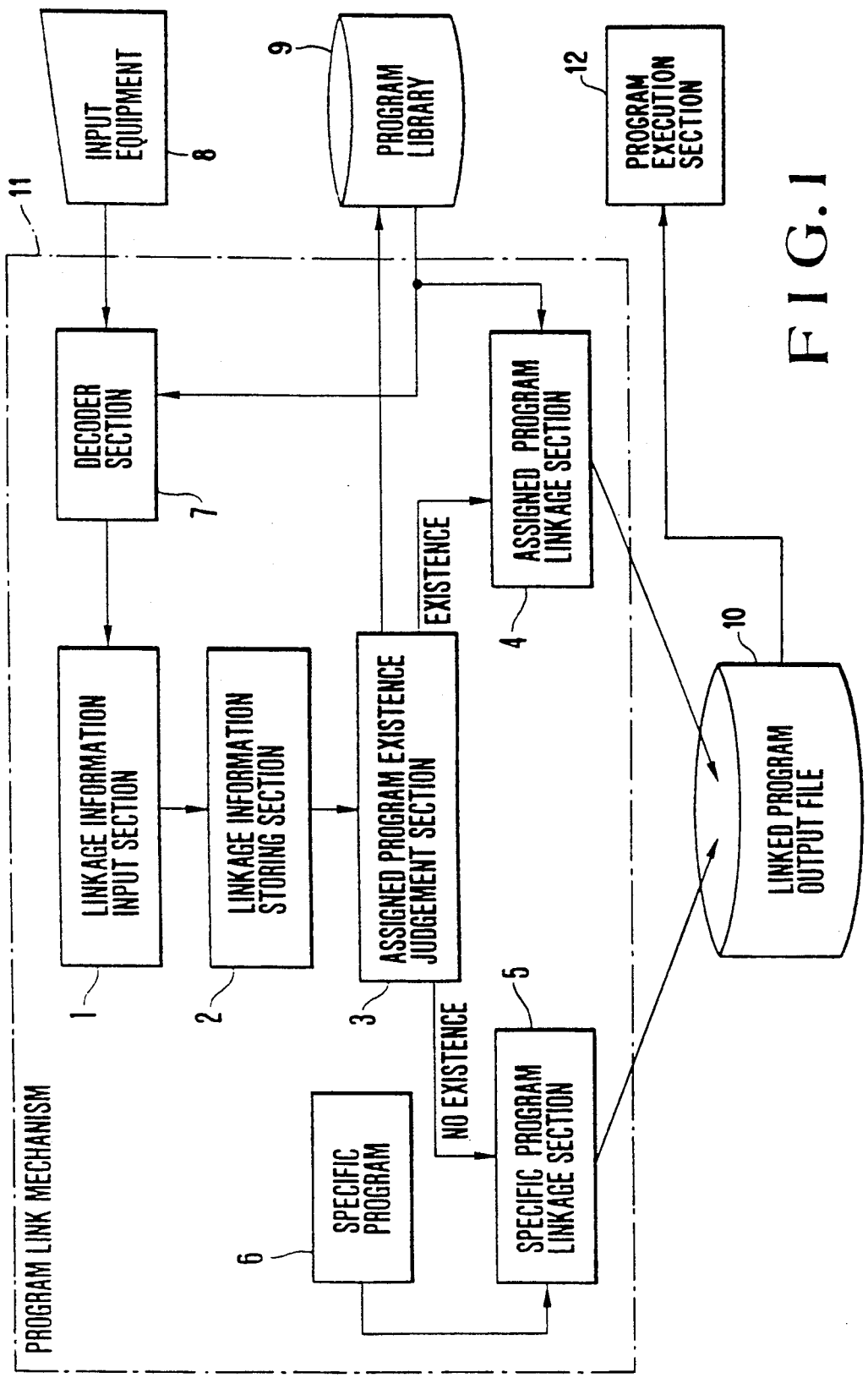
F I G. 1

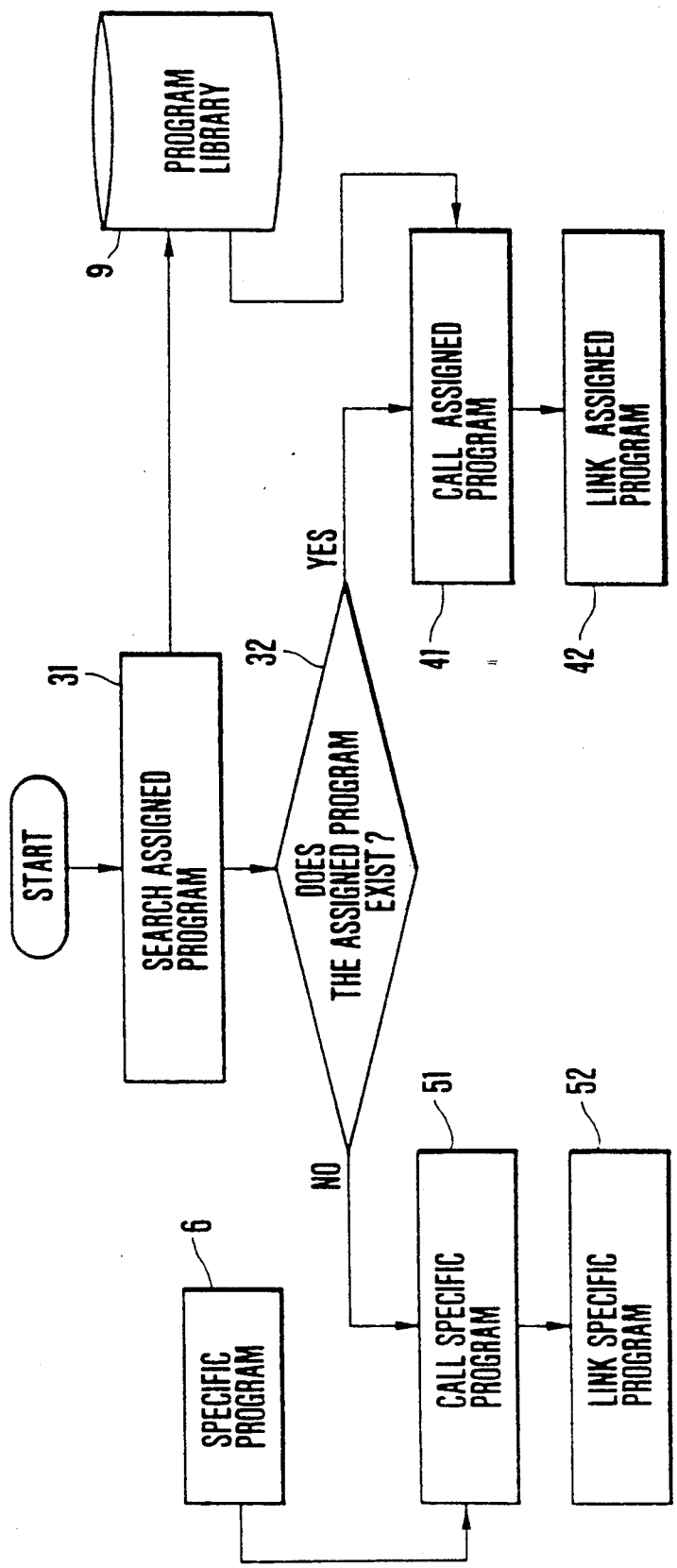
F I G. 2

PROGRAM PARTIAL LINKING SYSTEM FOR LINKING A SPECIFIC PROGRAM PREPARED IN ADVANCE WHEN AN ASSIGNED PROGRAM IS NOT IN A PROGRAM LIBRARY

This application is a Continuation of application Ser. No. 07/097,097, filed Sep. 16, 1987, now abandoned.

BACKGROUND OF THE INVENTION

The present invention relates to a program linking system and, more particularly, to a system for partially linking a plurality of unit programs.

In a conventional computer system, in order to link a plurality of unit programs to form a single program having one execution format and to execute the single program, names of unit programs and names of means storing the unit programs are given to the computer system during linking. In conventional linking systems, if a unit program to be linked to a given unit program does not exist in the program storing means such as a program library, the program having an execution format is generated while the assigned program is not linked to the given program. During execution of the program, when control is shifted to the unit program assigned by control shift information such as a call instruction, an execution error occurs and the subsequent operation cannot be performed. When the execution error occurs, if the error is caused by nonlinkage of the assigned program or the error is caused by another cause cannot be determined.

The following schemes must be employed to execute only other linked unit programs without causing an execution error when the unit program assigned by the control shift information does not exist in the conventional program linking system.

(1) An original program is corrected so as not to call the unit program and then, linkage operation is performed again, and
(2) A dummy program having a given name is generated for each nonexistent unit program and is stored in the program storing unit.

In a conventional scheme (1) described above, however, the original program must be corrected, and the operations are cumbersome. At the same time, errors may occur during correction.

In a conventional scheme (2) described above, the dummy program having a given name must be generated in units of nonexistent unit programs. When the number of nonexistent unit programs is increased, the number of dummy programs is increased, and preparation procedures are complicated. In addition, if the name is to be changed, the dummy program must be corrected.

SUMMARY OF THE INVENTION

It is an object of the present invention to eliminate the conventional drawbacks described above and to provide a simple system for partially linking unit programs, wherein only normally linked unit programs can be executed without causing execution errors even if a unit program to be linked does not exit in the program storing library.

The program partial linking system the present invention comprises a program library for storing a plurality of programs linkage information input section for inputting linkage information during program linking, a linkage information storing section for storing the linkage information input from the linkage information input section, an existence judging section for judging whether a program assigned by the linkage information stored in the linkage information storing section exists in the program storing library, an assigned program linking section for linking a program assigned by the linkage information when the program is judged to exist by the existence judging section, and a specific program linking section for performing linkage of a specific program, prepared in advance, in place of a nonexistent program judged by the existence judging section.

BRIEF DESCRIPTION OF THE DRAWINGS

FIG. 1 is a block diagram of a program partial linking system according to an embodiment of the present invention; and FIG. 2 is a flow chart for explaining the operation of the system shown in FIG. 1.

DETAILED DESCRIPTION OF THE PREFERRED EMBODIMENT

FIG. 1 is a block diagram of a program partial linking system according to an embodiment of the present invention, and FIG. 2 is a flow chart for explaining the operation of the system shown in FIG. 1. Referring to FIG. 1, input equipment 8 (e.g., a console), a program library 9, and a linked program output file 10 are connected to a program link mechanism 11 to provide linked programs to the program execution section 12 of a conventional computer. The program link mechanism 11 includes a linkage information input section 1, a linkage information storing section 2, an assigned program existence judgement section 3, an assigned program linkage section 4, a specific program linkage section 5, a specific program 6, and a decoder section 7.

Referring to FIG. 1, when program linkage is to be performed, a user enters necessary data from the input equipment 11. The necessary data includes the name of the library in which a unit program is stored, the name of a unit program including an execution start address, and a name of a file for storing the linked program having an execution format and is supplied to a program link mechanism 11, thereby starting the program link mechanism.

When the program link mechanism 11 is started, the decoder section 7 decodes an instruction and extracts linkage information from the decoded contents and the contents of the unit program stored in the program library 9. This linkage information represents which unit program accesses which unit program. The linkage information and control information are supplied to the linkage information input section 1.

When the linkage information input section 1 receives the linkage information from the decoder section 7, the input section 1 transfers to the linkage information to the linkage information storing section 2. The linkage information storing section 2 stores the received linkage information therein, and the assigned program existence judgement section 3 is started.

When the assigned program existence judgement section 3 is started, it searches for a unit program assigned by the linkage information in the program library 9 in step 31 of FIG. 2. If YES in step S32, i.e., if the assigned program is determined to exist in the library file, the assigned program linkage section 4 is started to access the asigned program (step 41). However, if NO in step S32, the specific program linkage section 5 is started (step 51).

In step 41, the assigned program linkage section 4 calls the assigned program from the program library 9 and links the assigned program with a unit program which is to be linked with the assigned program (step 42).

In step 51, the specific program linkage section 5 calls the specific program 6 prepared in advance. The linkage section 5 links the specific program 6 with a unit program which is to be linked with the specific program in step 52.

The operation of this embodiment will be described in detail under the following assumptions. Assume that programs A, B, and C exist in the program library 9 and that the main program A calls the unit programs B and C and unit programs D and E, the latter two of which do not exist in the program library 9.

Referring to FIG. 1, when the linkage information input section 1 inputs information representing "B is being called" (to be referred to as information call-B hereinafter), the linkage information storing section 2 stores the information call-B and the assigned program existence judgement section 3 searches the unit program B in the program library 9. Since the unit program B exists in the program library 9, the assigned program linkage section 4 links the unit program B with the main program A. Similarly, the unit program C is linked to the main program A.

When the linkage information input section 1 inputs information call-D, the linkage information storing section 2 stores the information call-D and the assigned program existence judgement section 3 searches for the unit program D in the program library 9. However, the unit program D does not exist in the program library 9. In this case, no existence of the unit program D is judged, and the specific program linkage section 5 links the main program A with a specific program (this program is assumed as a program X) prepared in advance. Similarly, if the linkage information input section 1 inputs information call-E, the program E does not exist in the program library 9. The specific program linkage section 5 links the main program A with the program X.

Assume that the main program A is executed after the above linkage operations are performed. If the main program A calls the unit program B or C, control is transferred to the unit program B or C, respectively. However, if the unit programs D and E are called, control is shifted to the program X, and the program X is executed.

If contents of the program X are set to restore control to the main program, only the programs A, B, and C normally linked are sequentially executed.

If the contents of the program X are set to restore control to the main program after a name of a calling main program and a name of a program which is not linked although it is called by the main program is output, information can be obtained such that the specific program (the program X in this case) is executed in accordance with which unit program (the unit program D or E in this case) is not linked to which program (the program A in this case). A method of outputting a name of a unit program which is not linked although it is called by the main program is exemplified as follows. When the nonexistence of the unit program D is judged by the assigned program existence judgement section 3, the name of the unit program D is stored in a storage area (not shown) in FIG. 1. During linkage of the specific program 6 by the specific program linking means 5, the address in which content is to be outputted in output processing of the name of the nonlinked unit program for the specific program 6 is set with the address of the storage area. It should be noted the processing contents of the specific program may vary in addition to the contents described above.

According to the program partial linkage system as described above, whether the unit program assigned by the linkage information exists is determined during linkage. If it does not exist, the assigned program existence judgement section 3 is arranged to cause the specific program linkage section 5 to link the main program with the specific program 6 prepared in advance. In linkage processing, only one specific program is prepared. Unlike in the conventional dummy scheme wherein dummy programs having identical names are stored in units of nonexistent unit programs and are stored in the program storing area, programming can be simplified. In addition, since the original program need not be corrected not to call the nonexistent unit programs, linkage operation can be simplified.

In the conventional dummy scheme, if the operator does not know the name of the nonexistent program, the dummy program cannot be generated. However, such a problem can be eliminated from the present invention.

When the contents of the specific program to be liked in place of the nonexistent unit program are to output the name of the calling main program or the name of the nonexistent unit program although it is called, information representing which unit program is not linked during execution can be obtained to greatly simplify debugging.

What is claimed is:

1. A program partial linkage system, comprising:
    program storing means for storing incomplete programs and additional programs, said incomplete programs requiring execution of at least a corresponding program of said additional programs for completion;
    means for providing a single replacement program for all said additional programs;
    input means requiring execution of said incomplete programs;
    searching means, coupled to said input means and to said program storing means, responsive to said input means for searching for said additional programs in said storing means and providing a search result;
    means, coupled to said searching means and to said means for providing, responsive to said search result including means responsive to an indication of non-existence of said corresponding program in said storing means for outputting said single replacement program from said means for providing said single replacement program;
    wherein said means responsive to said search result includes means responsive to an indication of an existence of said corresponding program in said storing means for outputting said corresponding program; and
    a linked program output file, coupled to said means for outputting said single replacement program and said means for outputting said corresponding program, for receiving said single replacement program from said means for outputting said single replacement program and said corresponding program from said means for outputting said corresponding program.

2. A program partial linkage system, comprising:

program storing means for storing a plurality of programs including a plurality of a first type of unit programs each requiring execution of at least an additional unit program of a plurality of a second type of unit programs;

means for providing a single specific program as a replacement for all unit programs of said second type;

data input means for providing input data identifying one program of said first type of unit programs and a storage location of said one program in said program storing means;

means, coupled to said data input means and said program storing means, for decoding said input data, retrieving said one program from said program storing means and determining therefrom linkage information including an identity of said additional unit program;

storage means, coupled to said means for decoding, for storing said linkage information;

searching means, coupled to said storage means and said program storing means, responsive to said identity from said storage means for searching said program storing means for said additional unit program to provide a search result;

means, coupled to said program storing means and said searching means, for retrieving said additional unit program from said program storing means in response to said search result indicating said additional unit program exists in said program storing means;

means, coupled to said means for providing a single specific program and to said searching means, for outputting said single specific program in response to said search result indicating said additional unit program does not exist in said program storing means; and file means, coupled to said means for retrieving and said means for outputting, for receiving said additional unit program from said means for retrieving or said single specific program from said means for outputting depending on said search result.

* * * * *